No. 649,757. Patented May 15, 1900.
G. B. ROBERTSON.
LUMBER DRIER.
(Application filed Dec. 23, 1897.)
(No Model.) 4 Sheets—Sheet 1.
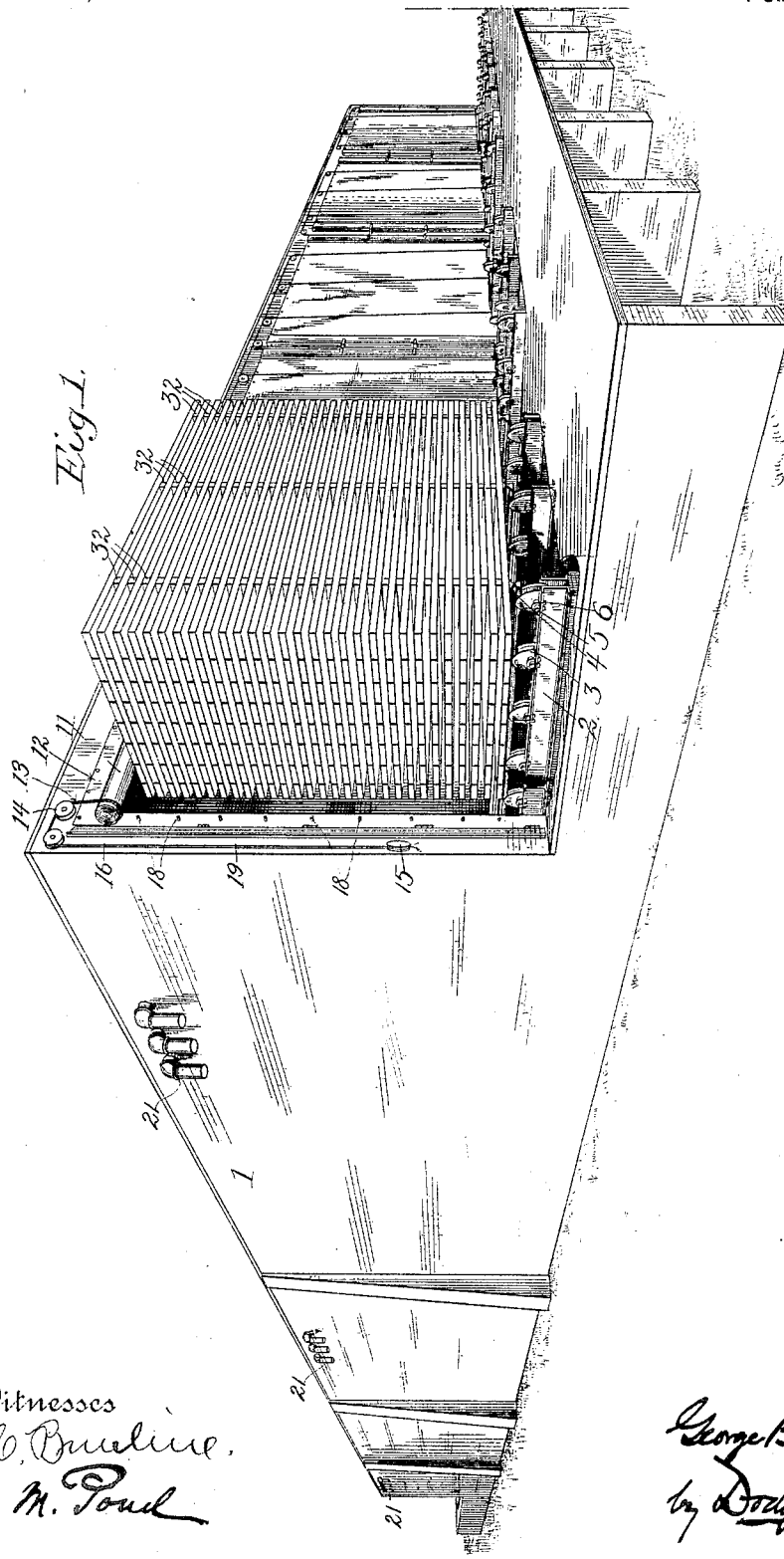

No. 649,757. Patented May 15, 1900.
G. B. ROBERTSON.
LUMBER DRIER.
(Application filed Dec. 23, 1897.)
(No Model.) 4 Sheets—Sheet 2.
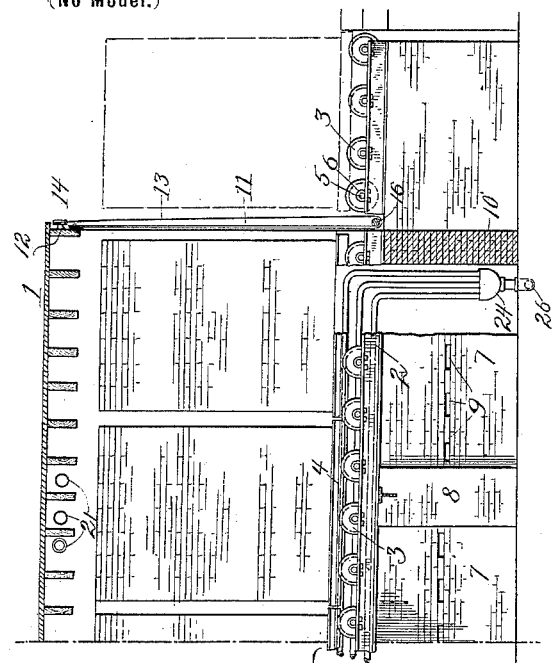
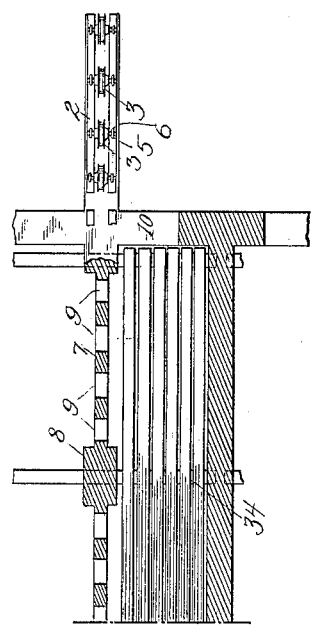
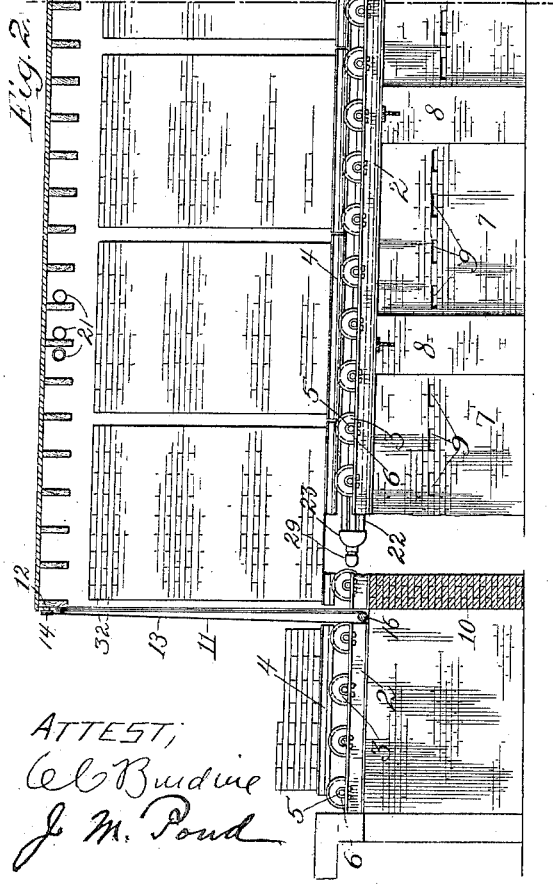
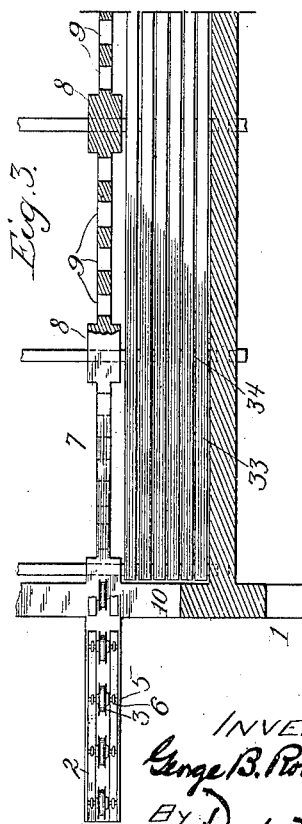
ATTEST:
C. C. Budine
J. M. Pond
INVENTOR:
George B. Robertson,
By Dodge & Sons,
ATTYS.

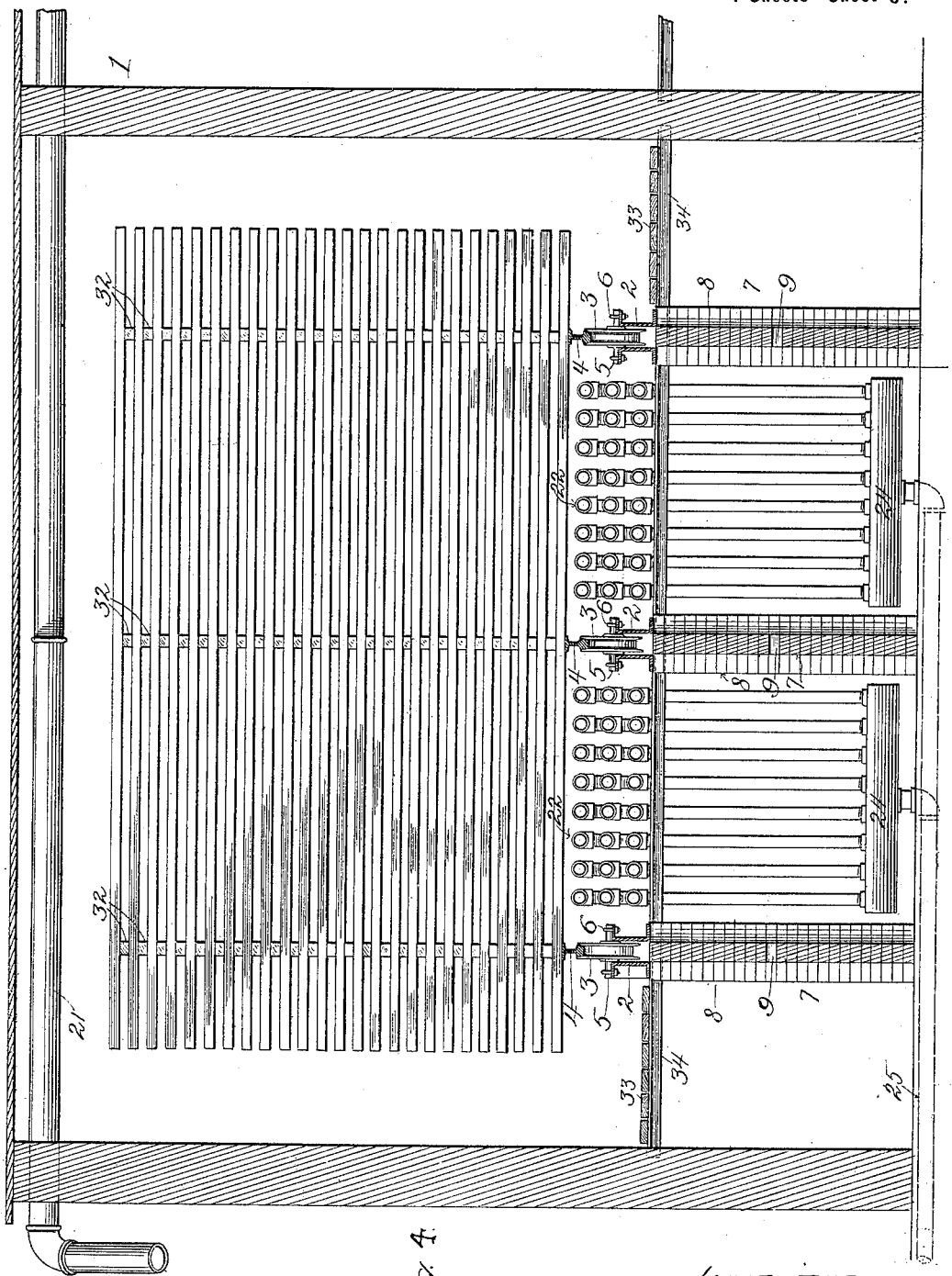

No. 649,757. Patented May 15, 1900.
G. B. ROBERTSON.
LUMBER DRIER.
(Application filed Dec. 23, 1897.)
(No Model.) 4 Sheets—Sheet 4.
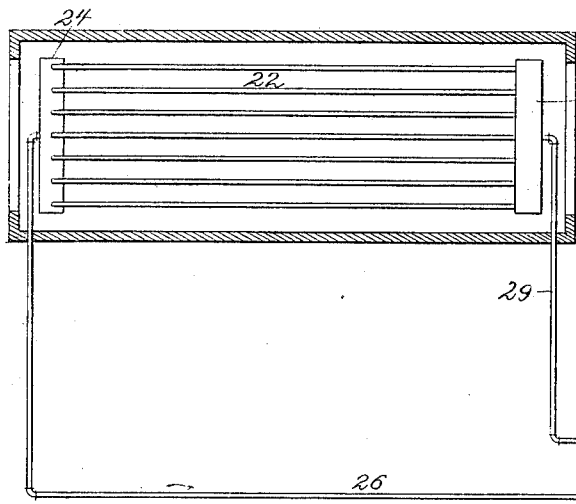
Fig. 7.
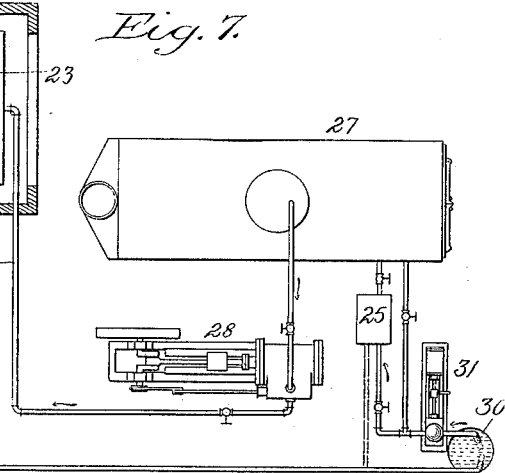
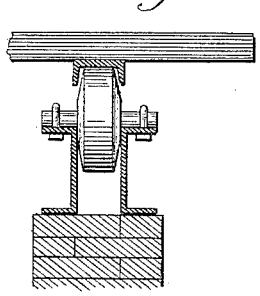
Fig. 8.
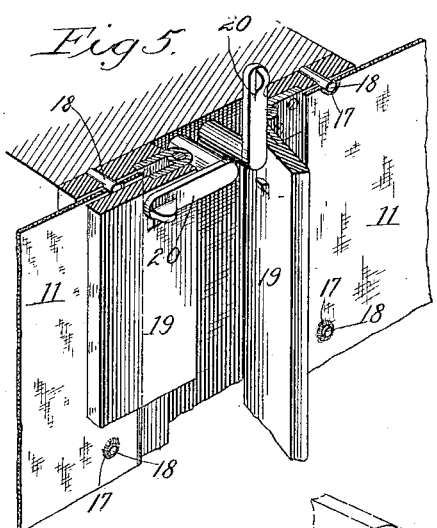
Fig. 5.
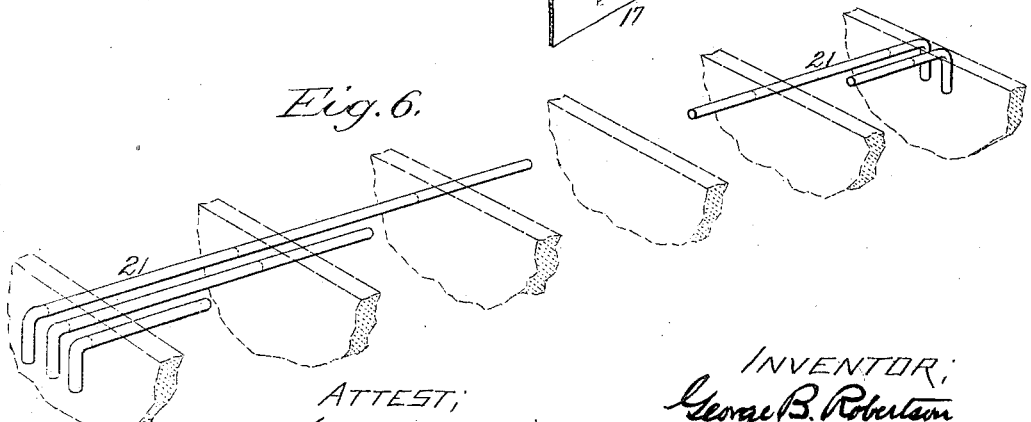
Fig. 6.
ATTEST:
INVENTOR:
George B. Robertson,
By Dodge & Sons,
ATTYS

UNITED STATES PATENT OFFICE.

GEORGE BOUNDS ROBERTSON, OF WHALEYVILLE, VIRGINIA.

LUMBER-DRIER.

SPECIFICATION forming part of Letters Patent No. 649,757, dated May 15, 1900.

Application filed December 23, 1897. Serial No. 663,211. (No model.)

*To all whom it may concern:*

Be it known that I, GEORGE BOUNDS ROBERTSON, a citizen of the United States, residing at Whaleyville, in the county of Nansemond and State of Virginia, have invented certain new and useful Improvements in Methods of and Kilns for Drying Lumber, of which the following is a specification.

My invention consists in a novel method of drying or seasoning lumber and in a kiln therefor, the peculiar features of both of which will be set forth in the following description.

The accompanying drawings illustrate the construction of the kiln, which will be first described, after which the method or process will be explained.

Figure 1 is a perspective view of a series of kilns built side by side with a view to handling large quantities of lumber and maintaining some portion of the plant always in operation. Fig. 2 is a vertical sectional view through one kiln or chamber from end to end, portions being removed to permit the structure to be shown on a reasonably-large scale and other parts being broken away to expose the steam-pipes; Fig. 3, a horizontal section on the line $x$ $x$ of Fig. 4; Fig. 4, a vertical cross-section of one kiln or chamber; Fig. 5, a detail of the curtain-fastenings; Fig. 6, a diagrammatic perspective illustrating the arrangement of the horizontal flues for escape of moisture and relief of pressure within the kiln; Fig. 7, a diagram illustrating the steam circulation, and Fig. 8 a view illustrating a modification of the supporting-rolls.

As hitherto commonly constructed drying-kilns for lumber have been provided with a system of flues more or less elaborate designed to effect a circulation of air-currents within the drying-chamber. So far as I am aware all kilns hitherto constructed have been provided with means for introducing or admitting air from without and causing it to circulate through the chamber either throughout the entire drying operation or at some stage therein, and it has also been the usual practice to provide means for withdrawing the moist air from the chamber. In order to provide space for the flues, it has been the general practice to construct such kilns of wood, which, however, is not only very liable to destruction by fire, but is subject to rapid deterioration. Under my plan of construction flues are wholly dispensed with throughout the structure, except that in some cases horizontal pipes or flues are carried from just below the roof of the structure to the outside to permit escape of moisture from and to prevent undue pressure within the drying-chambers. These flues may, if preferred, be omitted.

Referring again to the drawings, 1 indicates a substantial structure consisting, essentially, of a roof and a series of parallel vertical walls, the number of which will vary according to the number of kilns or chambers desired. If a single chamber is wanted, there will of course be but the two walls; though it is deemed advantageous to employ a series of such chambers side by side. The walls are preferably placed from nineteen to twenty feet apart to accommodate the ordinary lengths of lumber and allow space between its ends and the walls of the chamber for the convenient passage of attendants. The space is, however, a matter of option, variable according to the conditions of any given case. So, too, the height of the chambers above the runways over which the lumber is moved may vary as desired, though I find a space of about twelve feet to answer well ordinarily. The walls are connected at top by a roof of any suitable construction. Within the chambers and extending outward therefrom at each end are runways for the lumber, and these have a fall of about one foot in fifty, more or less, as found expedient. The runways consist of metal beams or girders 2, arranged in pairs and held apart by spacing-blocks or otherwise, with wheels or rollers 3 placed between and projecting above the beams, as seen in Figs. 1, 2, and 4. While the measurements are not important, but may vary as occasion may require or suggest, I have found it convenient to employ channel-iron beams of about six inches depth, spaced about four and a quarter inches apart, and to make use of grooved wheels of ten inches diameter, with a flange extending radially about a half inch farther. Such wheels are well suited to receive and support T-rails 4, which I find it convenient to employ and to place in an inverted position, with their treads lying in the grooves of the wheels and spanning or bridging from one wheel to another, as indicated in Figs. 1 and 2. The wheels are conveniently made to turn freely upon axles 5, resting upon the flanges of the beams 2 and firmly clamped thereto by U-bolts 6, as shown in Figs. 1, 2, 3, 4, and 8; but the axles may of course turn in bearings, if preferred. Obviously angle or channel irons may be used at will and of any desired dimensions. The axles may be set at such distances apart as found advisable, twenty inches being a suitable distance under ordinary conditions, and with the rails 4 cut to a length of six feet. These measurements are, however, merely suggestive, being those which I have found satisfactory in practice.

The beams or girders 2 are carried upon walls 7, extending lengthwise of the drying-chambers and preferably constructed as illustrated in Fig. 3—that is to say, with a series of piers 8 at convenient intervals—say eight feet from center to center—connected by a wall of a single thickness of brick, with bricks omitted at intervals to leave openings 9. I have found it convenient to employ three runways, and consequently three such walls, one at the middle of the chamber and the others about six feet therefrom and on opposite sides, measuring from center to center; but this distance may vary. It is desirable to give sufficient slant to the runways to facilitate the movement of the lumber-piles over them. Hence I give to the walls and runways an inclination from the receiving end downward toward the delivery end of approximately one foot in fifty. In the kilns actually constructed the chambers have been one hundred and ten feet in length and the fall two feet, which is found quite satisfactory. At the ends of the chambers cross-walls 10 are constructed of the same height as the walls 7 at the respective ends, thus closing and sealing the chambers from the ground-line to such height.

Heretofore it has been customary to employ vertically-movable counterbalanced doors arranged like window-sash for closing drying-kilns. Such doors are unsatisfactory for the reason that they cannot be closely fitted and yet run freely, but are liable to warp and twist, and consequently to bind or to draw away from the faces with which they are designed to move in contact. Moreover, they necessitate the application of considerable force to raise and lower them and the employment of hooks or other means to start them downward when elevated. To obviate these objections and insure an efficient sealing of the chamber, which I deem important, I provide each opening with a curtain 11, of canvas, rubber cloth, asbestos, or other suitable material, painted, coated, or otherwise treated, if need be, or left in its natural condition. Canvas, well painted or filled, rubber cloth, and asbestos, have all been tried by me with good results, canvas being, perhaps, the most satisfactory. The manner of hanging and controlling said curtain may vary, any usual way of arranging heavy curtains being available. In the drawings I have shown the curtain firmly secured along its upper edge to the facing 12 of the kiln, directly across the top of the opening, and I carry ropes or bands 13 down on one side and up on the other side of the curtain, thence over pulleys 14, and finally to a cleat 15 or other place of fastening. By drawing in or paying out the bands or ropes the curtain may be quickly and easily raised or lowered, a roll 16 at the lower edge serving to insure its proper winding and unwinding. To make the curtain tight at its sides, I provide means for clamping its side edges from top to bottom. This may be done in a variety of ways; but I find it convenient to provide the edges with eyelets or gromets 17, which are engaged over pins or studs 18, projecting from the facing-strips of the walls, as seen in Figs. 1 and 5. To insure retention of the eyelets upon the studs or pins, I provide cover-strips 19, which may conveniently be hinged to the facing-strips and arranged to close over the ends of the studs or pins, as shown in Fig. 5, where they may be secured by turn-buttons 20, also shown in said figure, or by any equivalent means. The roller frames or girders 2 are cut away or set back sufficiently at each end of the kiln to permit the curtain to drop to or below the lower line of the kiln-opening to insure its perfect closure.

It is desirable that means be provided for escape of moisture from the interior of the kilns, though it may not be desired to utilize such means at all times. To afford such outlet, I provide pipes 21, which are carried from the outer wall inward to different distances, as illustrated in Fig. 6, each pipe terminating within and at or about the mid-width of one or another kiln or chamber. Such pipes may be repeated at intervals, if desired, Fig. 1 showing three sets. The pipes or flues extend horizontally and are located just beneath the roof, as indicated. To prevent wind or rain from driving into the pipes, their outer ends may be provided each with a bend or elbow and, if desired, with a short length of pipe. By arranging the elbow to turn upon the horizontal pipe the outlet may be raised or lowered, and thus the resistance offered to escape of vapor from within the kiln may be varied as desired. I have thus far found in practice, however, that the pressure from within is sufficient to exclude wind and rain and that it is only necessary ordinarily to extend the ends of the pipes through the wall without bend or elbow of any kind. The number and size of the pipes will be proportioned to the size of the kiln and the character of the lumber treated and will ordinarily be sufficiently small to insure the maintenance of pressure within the kiln.

Within each kiln or chamber there is provided a system of steam-pipes 22, which pipes I find it desirable to arrange between the roller frames or girders, as in Figs. 2 and 3, giving them about the same fall, and thus insuring proper flow of the water due to condensation. The arrangement of the pipes is open to variation; but I find it quite satisfactory to employ at the receiving end a box or casting 23 at or about the level of the inlet end of the pipe system, with which connects a pipe 29 from the source of steam-supply. The pipes 22 extend lengthwise of the drying kiln or chamber, as indicated in Figs. 2, 4, and 7, and at the delivery end of the kilns drop down to a second box or casting 24, which is in turn connected with the feed-water well or tank or with the feed-water heater 25 by a pipe 26, as indicated in Fig. 7. The pipes are preferably arranged in tiers one above another, their number and size depending upon the requirements of the particular case.

In Fig. 7 I have represented, diagrammatically, the preferred arrangement of the plant whereby to utilize the exhaust-steam of the engine of the mill for affording heat in the drying-kiln and to return the steam to the feed-water heater for the purpose of heating the water therein or to return the condensed steam to the feed-water reservoir or well, so that it may be fed into the boiler at a relatively-high temperature. 27 indicates a steam boiler or generator, 28 a stationary engine supplied therefrom, and 29 a pipe connecting the exhaust-port of the engine with the head or casting 23 of the steam-pipe system in the kiln. From the head or casting 24 at the foot of the steam-pipe system the pipe 26 passes to the feed-water well or tank 30, whence it may be delivered by a pump 31 directly to the boiler 27 or to the feed-water heater 25, for which suitable pipes and valves are provided, or it may pass by a pipe (indicated by dotted lines in said figure) directly to the feed-water heater. In this way I am enabled to utilize very fully the heat units of the fuel employed in generating steam, it being found in practice that after making the complete circuit the steam returns with heat sufficient to bring the feed-water to a temperature above 200° and, in fact, very near to the boiling-point.

The kiln being constructed as above set forth is supplied with lumber by placing the rail lengths or sections 4 in an inverted position upon the wheels 3 and piling the lumber thereon in tiers or layers, each separated from the next by the usual separating-strips 32. Heretofore it has been found necessary to place such strips at the extreme ends of the boards or planks, as well as at intervening points, five of such separating-strips being usually employed. Under my mode of treatment it is found unnecessary to employ so many strips, and the extreme ends may be left wholly unsupported by such strips, and the number used may be reduced to three, of which there is one over each rail 4, as shown in Fig. 1. The rails being six feet in length, preferably, and the kiln having the clear height of about eleven feet, the lumber may be piled to a height of ten feet, more or less, and yet travel freely through the kiln. The size of the lumber piles is, however, optional and may be varied at will. As the piles are completed the curtain at the receiving end is raised and the pile is rolled forward into the kiln and left first at the receiving end and just within the chamber, where the heat is greatest, owing to the fact that the steam enters at that point. As fresh piles are formed those previously introduced are moved backward into the kiln, and so on until the kiln is full or until as many piles are introduced as deemed expedient. The length of time that the lumber is subjected to the heat will vary according to the character and the condition thereof; but owing to the fact that a walk 33 is provided throughout the length of each kiln or chamber, being supported upon cross rails or girders 34, extending from the main walls to the walls which support the roller-frame, the attendants may at any time go into and through the kiln and examine the lumber therein.

Practical use of the process has demonstrated that it possesses many and important advantages over the ordinary methods of drying lumber. Among these may be mentioned the fact that the shrinkage of the lumber under this mode of treatment is materially less than under the ordinary mode, never exceeding fifty per cent. of the shrinkage heretofore experienced. The lumber when dried to the full extent required is heavier and the wood is left with more "life" and spring, works better, and is stronger than lumber treated in the ordinary way.

It is well known that kiln-dried lumber is often spongy and dead, causing great difficulty in working under the plane and not affording that smooth hard surface obtainable with lumber seasoned in the old way and without the use of heat. Lumber treated by my process is found to retain its desirable properties, and it is further found that if taken from the kiln and exposed to the air before it is completely dried it does not blacken, as does lumber treated in ordinary kilns. Pitch pine, or so-called "fat wood" or "light wood," is treated with peculiar benefit in this kiln. It is found that a considerable portion of the rosin is brought to the surface and dried off, while another considerable portion is retained in the wood; but in no case does it drip from the ends of the boards to those beneath, as has invariably happened with kilns of prior construction. This dripping of the rosin has been a very serious difficulty, since it spoiled the boards upon which it fell or reduced them from one to two grades below what they would otherwise have been. It is also found that boards treated by my process do not warp or check at the ends and that the knots are left tight in the lumber, whereas under ordinary methods of treatment in kilns the knots are loosened and fall out, thus again decreasing the value of the lumber. These facts having been definitely ascertained by practical use on a large scale and for a considerable period of time and being obtainable from the description and explanation above given, it is not deemed necessary to set forth the theory upon which the differences in result rest. It is my belief, however, that the vaporization of the moisture in the wood by the heat within the chamber and the pressure due to the vapor so produced contribute to carry off the watery particles contained in the lumber without eliminating the resinous and other substances contained in the pores of the wood. It is found, however, that the wood is thoroughly seasoned to the center and that those boards which are immediately above the steam-pipes are not impaired by their proximity to said pipes, nor are those at the top unseasoned or insufficiently treated by reason of their being farther removed from the pipes.

For the various reasons above stated the construction and the mode of treatment are highly advantageous as compared with the best kilns and systems of drying with which in a wide experience in this field of work I have become acquainted.

In Fig. 8 there is shown a modification of the rollers and rail-section or lumber-support, the roller being in this case without flanges and the rail or lumber support being in the form of a channel-iron bar.

The mouths of the pipes 21 may be closed by plugs, dampers, or otherwise either at the inner or the outer ends of the pipes to regulate the escape of vapor from the chamber, it being desirable to maintain at all times a certain amount of pressure within the chamber and upon the lumber, said pressure apparently contributing materially to the attainment of the results herein set forth. The flexible curtains yield to a considerable degree to the internal pressure occasioned by the vapor given off by the lumber and tend to equalize the pressure and the consequent rate of escape of the vapor from the kiln. It is found in practice that the curtains are almost constantly bulged outward in greater or less degree, thereby indicating the existence of pressure from within, to which pressure is due the elimination or discharge of the moisture-laden vapor.

The method of treatment herein set forth is made the subject-matter of a divisional application carved out of this case in compliance with the rule of the Patent Office and the specific requirement made in this case, which divisional application was filed in the Patent Office on the 19th day of April, 1900.

Having thus described my invention, what I claim is—

1. A kiln for lumber, consisting of a chamber provided at its ends with openings and with means for hermetically sealing said openings; outlets at or near the top of the chamber for escape of vapor from the lumber; and a system of heating-pipes extending into said chamber, the chamber being closed against communication with the external atmosphere when in use, except by the outlets at or near its top.

2. In combination with a drying-kiln having openings for the entry and exit of lumber; flexible curtains applied to said openings to seal the same; and fastenings for securing the edges of said curtains.

3. In combination with a drying-kiln, curtain 11; ropes or bands for raising and lowering the same; and fastenings for securing the edges of said curtains.

4. In combination with kiln 1, curtain 11 provided with eyelets 17; and pins or studs 18 projecting from the structure at the sides of the opening therein and adapted to receive and hold the eyelets of the curtain.

5. In combination with structure or kiln 1, curtain 11 applied to the opening thereof and provided with eyelets 17; pins or studs 18 projecting from the structure at the sides of the opening; covering boards or strips 19 arranged to overlap the ends of the studs; and means for securing the cover-strips in place.

6. In combination with kiln or structure 1, curtain 11 provided with eyelets 17; pins or studs 18 to receive said eyelets; hinged cover-strips 19; and locking-buttons 20 to hold the strips against the pins.

7. In combination with a drying-kiln provided with openings for introduction and removal of lumber, and with means for sealing said openings, heating-pipes within said structure; and horizontal pipes or flues opening out of said chamber at or above the top line of the lumber and communicating with the outer atmosphere, whereby vapor produced within and rising to the top of the kiln is carried directly out of the kiln, while the external air is precluded from entering.

8. In a kiln, the combination of a drying-chamber provided with openings at its ends for the ingress and egress of lumber; means for closing said openings; a series of frames within said chamber provided with rolls; supporting-walls for said frames having openings through them for the equalization of air-pressure upon the different sides thereof; and heating-pipes within said chamber, all substantially as described.

9. The herein-described kiln, consisting of the structure 1, provided with longitudinal walls 7, and end walls 10; flexible curtains 11; fastenings for said curtains; steam-pipes 22; and horizontal pipes 21 extending outward from the top of the chamber to the atmosphere.

10. In combination with a drying-kiln otherwise closed to the atmosphere, horizontal pipes or flues opening from the upper portion thereof to the atmosphere to permit the escape of moisture.

11. In combination with a drying-kiln, horizontal pipes or flues opening from the upper portion thereof to the atmosphere and provided with downwardly-turned ends, substantially as and for the purpose set forth.

12. In combination with a kiln, horizontal pipes or flues opening from the upper portion thereof to the external atmosphere and provided with downwardly-turned sections adapted to be swung to different elevations to vary the height of the outlet and thereby to determine the pressure within the kiln.

13. In a kiln, the combination of a drying-chamber provided with openings at its ends for the ingress and egress of lumber; curtains for closing said openings; a series of frames within said chamber provided with rollers; rail-sections adapted to rest upon the rollers and to support the lumber to be dried; and heating-pipes located within said chamber, substantially as set forth.

In witness whereof I hereunto set my hand in the presence of two witnesses.

GEORGE BOUNDS ROBERTSON.

Witnesses:
HARRY E. BRITTINGHAM,
RICHARD G. REBER.